Patented Apr. 25, 1950

2,505,226

UNITED STATES PATENT OFFICE 2,505,226

POLYCHLOROPRENE RUBBERS

Robert S. Barrows, Wilmington, Del., assignor to E. I. du Pont de Nemours & Company, Wilmington, Del., a corporation of Delaware No Drawing. Application November 15, 1946, Serial No. 710,219

4 Claims. (Cl. 260—27)

This invention relates to the preparation of polychloroprene in a form which resembles natural crepe rubber.

The use of natural crepe rubber for such articles as shoe soles is well known. For this purpose, selected crepe rubber is formed with the least milling possible into thin sheets which are pressed together into thicker sheets of the thickness desired for the soles, which are given no vulcanizing treatment. Because the rubber is more or less rapidly plasticized by milling or other mechanical working and thus becomes too soft for use in the form of soles, only carefully selected crepe with the greatest resistance to plasticizing can be used, the introduction of pigments, fillers and other desirable ingredients (which must be incorporated by milling) is limited, and the scrap remaining after the soles are cut from the sheets cannot ordinarily be remilled and used again for soles because of the plasticizing which unavoidably takes place during this treatment. In addition, the natural rubber soles are far from ideal in service because of the inherent sensitivity of natural rubber to the softening action of sunlight and of petroleum products. The various polymers of chloroprene already developed, however, even though they have much better resistance to softening by light and oils, do not have the physical properties required for crepe shoe soles with respect to either their manufacture or use. Thus, the plastic types are too soft for the purpose, while the elastic types, described, for example, in U. S. Patent 1,967,861, are too tough and dry to be milled satisfactorily into a rough, crepe-like sheet. Even when in some case a rough sheet can be obtained by long milling, which is commercially impracticable, the sheets are almost entirely lacking in tackiness and therefore cannot be built up into the thicker layers required for soles. The plasticizable polymers such as described in U. S. Patent 2,234,215, which are made by emulsion polymerization of chloroprene in the presence of sulfur followed by the addition of a reagent such as a tetraalkyl thiuram disulfide to the latex, coagulation in thin sheets, and drying, do pass through a stage while they are being plasticized in which they more closely resemble crepe rubber. This form, however, is transitory and unstable and during storage and service would become too plastic and the sole would become worthless. Furthermore, chloroprene polymers usually become too dark on aging to be acceptable in light-colored goods of this kind.

It is therefore an object of this invention to prepare a new type of chloroprene polymer, resembling natural crepe rubber in being light-colored even on aging and sufficiently plastic and tacky to be formed into solid, continuous sheets but sufficiently tough and elastic, even without vulcanization, to be used for shoe soles. Another object of this invention is to prepare a polymer of chloroprene with these properties which will also show improved stability toward softening by milling, aging, or exposure to light or petroleum hydrocarbons. Other objects and advantages will appear from the following description.

It has been found that, by polymerizing chloroprene in aqueous emulsion in the absence of compounds (such as sulfur and mercaptans) which lead to the formation of thoroughly plastic polymers but in the presence of an acid-stable dispersing agent and a water soluble salt of a rosin acid, and incorporating in the resulting latex a tetraalkyl thiuram sulfide and then acidifying, coagulating, washing and drying, a polychloroprene crepe rubber can be produced which is light in color even on aging, and sufficiently plastic and tacky to be formed into solid, continuous sheets but sufficiently tough and plastic, even without vulcanization, to be used for shoe soles. This polychloroprene crepe also shows improved stability toward softening by milling, aging, exposure to light or petroleum hydrocarbons. There is also preferably incorporated in the latex before coagulation, a non-discoloring antioxidant, which makes the polymer still more resistant to softening on aging. It is also desirable to incorporate in the rubber a weakly basic substance, such as magnesium oxide and sodium acetate, to absorb hydrogen chloride liberated on aging. The polychloroprene crepe is preferably coagulated from the latex by freezing in thin layers.

The following examples are given to illustrate the invention. The parts used are by weight, unless otherwise specified.

Example 1

100 parts of chloroprene containing 4 parts of Nancy wood rosin is emulsified in a solution of 0.83 part of sodium hydroxide and 0.75 part of "Daxad-11" (sodium salt of the condensation product of naphthalene sulfonic acid and formaldehyde) in 160 parts of water. Polymerization is started and maintained at 40° C. by adding in small increments 0.3 part of potassium persulfate as a 5% aqueous solution. When the density of the dispersion reaches 1.072 indicating a polymer yield of 90%, 0.25 part of sodium bisulfite is added as a 2.5% aqueous solution to destroy any residual potassium persulfate. 0.5 part of monobenzyl ether of hydroquinone and 0.5 part of tetraethyl thiuram disulfide are added as aqueous benzene dispersions made by dispersing benzene slurries of these agents in aqueous solutions of the sodium salt of sulfonated oleyl acetate and the formaldehyde condensation product referred to above (Daxad-11). The latex is acidified to a pH of 6.6 to 6.8 with 10% aqueous acetic acid and the polymer is coagulated by freezing in thin layers as described in U. S. Patent 2,187,146. The coagulated polymer film is thawed with a minimum amount of warm water and then dried in a hot air chamber. There results a light-colored polymer from which crepe shoe soles may be readily prepared by the following procedure.

*Example 2*

The polymer made as in Example 1 is compounded on an ordinary rubber mill with 1 part of MgO, 0.15 part of $TiO_2$ and 0.003 part of Rubber Yellow G (a finely divided, dispersible yellow pigment) per 100 parts of polymer. A rough but continuous crepe-like sheet is formed which does not become appreciably more plastic during the incorporation of the pigments. The compound is taken off the mill in thin sheets, which are then laminated and passed between rolls or consolidated in a press to form a sheet of the thickness desired for shoe soles. These sheets, from which the soles may be cut with a die, are solid, homogeneous, elastic, resilient and very tough, with a pebbled, non-slippery surface. The material thus possesses the desirable properties of natural crepe rubber and can be directly substituted for it in the manufacture of shoe soles. In addition, it is much more resistant to the softening action of heat, aging, hydrocarbons and, particularly, sunlight. Thus, whereas even brief exposure of a natural crepe rubber surface to sunlight produces a highly objectionable stickiness due to degradation of the outer layer, the product of the present invention remains free from softness and tackiness indefinitely.

The polymerization of the chloroprene in the present invention may be carried out according to the procedure described, for example, in U. S. Patent 2,264,173, except that (1) a water soluble salt of a resin acid must be present, (2) the dispersion must be alkaline but must contain a dispersing agent which is also effective in acid solution, and (3) the system must be free from any substances which would lead to the formation of a thoroughly plastic product. By this, it is meant to exclude not only mercaptans and similar regulating agents disclosed in U. S. Patents 2,227,517, 2,227,518 and 2,227,519, certain classes of iodine compound disclosed in U. S. application Serial No. 617,919 now Patent No. 2,463,225, March 1, 1949, of Vincent and Serial No. 671,914 and 671,915 now Patent No. 2,481,044, September 6, 1949, of Scott, and certain nitrogen bases in Serial No. 659,155 now Patent No. 2,456,243, December 14, 1948, and 659,156 now Patent No. 2,478,738, August 9, 1949, of Barrows, but also sulfur, which of itself does not yield a plastic polymer of chloroprene but which, as shown in U. S. Patent 2,234,215, yields a polymer which is readily plasticized by thiuram sulfides and many other compounds. The thoroughly plastic polymers described in the above references are entirely different and distinct, as repeatedly pointed out therein, from the nonplastic polymers made without these regulating agents.

The expression "regulating agent" is used to designate those agents which, when present during polymerization, lead directly or indirectly to the formation of a plastic polymer.

Examples of the water-soluble salts of rosin acids which may be used are the sodium, potassium and ammonium salts of abietic acid and of similar acids isolated from natural resins and also the crude salts formed by neutralizing rosin, hydrogenated rosin, disproportionated rosin, and the like. The product obtained by neutralizing wood rosin with sodium hydroxide is preferred. It is most conveniently formed by dissolving the rosin in the chloroprene and dispersing it in water containing an excess of the alkali. The preferred acid stable dispersing agent is that used in the example, although others, such as those discussed in U. S. Patent 2,264,173, may be employed. Suitable amounts of the salts of resin acids, calculated as rosin, are between 2% and 10% of the chloroprene, preferably about 4%. Suitable amounts of the acid stable dispersing agents are between 0.25% and 2%, preferably about 0.75%.

The polymerization is preferably accelerated by the use of the usual accelerators (catalysts) discussed in U. S. Patent 2,264,173. When an excess of a peroxide catalyst such as potassium persulfate is present at the end of the reaction and a phenolic antioxidant is to be added, destroying the catalyst by adding a reducing agent such as sodium bisulfite or sodium hydrosulfite has been found to prevent a discoloration of the polymer which the phenolic compound would otherwise cause.

The tetraalkyl thiuram sulfide may be employed in amounts ranging from 0.1% to 3.0% of the weight of the chloroprene. 0.5% will ordinarily be found suitable. Examples of the tetraalkyl thiuram sulfides contemplated are tetrabutyl thiuram disulfide, tetramethyl thiuram monosulfide, tetramethyl thiuram disulfide and tetraethyl thiuram disulfide. The last is preferred. Preferably, the alkyl group should not contain more than six carbon atoms.

Examples of suitable non-discoloring antioxidants (a class of compounds well known in the art) are hydroquinone monobenzyl ether and parahydroxy diphenyl. These may be employed in amounts customarily used in polychloroprene rubbers.

Although satisfactory results are obtained irrespective of the acidity reached on neutralizing the latex, it has been found that a final pH of about 6.6 to 6.8 is most desirable. Below 6.4 the polymer which results discolors to some extent, while at a pH above 7.0 the coagulum formed by freezing (the preferred method) is more difficult to wash and dry.

It is preferred to acidify with acetic acid and to wash the coagulated polymer only slightly, since sodium acetate (which is thus formed and retained in the polymer) has been found to improve the stability by absorbing the liberated hydrogen chloride. It is often desirable to add more sodium acetate during milling. Other slightly basic materials, such as magnesium oxide, sodium fluoride, calcium silicate, magnesium acetyl acetonate, magnesium stearate and sodium stearate, may be used in place of the sodium acetate for the same purpose.

As pointed out above, pigments and other compounding ingredients may be incorporated into the polymers of the present invention by ordinary milling without causing any of the undesirable softening which takes place with natural crepe rubber.

When compared with natural crepe rubber, the polychloroprene crepe of this invention has the following advantages:

(a) It is more uniform.

(b) It resists softening by milling, permitting the reuse of scrap and giving more freedom to the manufacturer. Milling of natural crepe rubber must be kept at a minimum because of its rapid degradation during milling.

(c) It resists sunlight and heat deterioration much better than natural rubber.

(d) It can be extended with cheap fillers; natural rubber crepe cannot because of excessive softening during mixing.

(e) It can be more readily pigmented than natural rubber, because the rapid mill breakdown of natural rubber makes pigmenting of polymer to be used in crepe soles difficult.

When compared with preoviously described synthetic rubbers, the product of this invention is outstanding in the following respects:

(a) It does not break down appreciably during the mechanical treatment required for incorporating pigments, sheeting, reworking, etc., and yet is sufficiently soft to be handled on a rubber mill.

(b) It resists softening during heating or sunlight exposure much better than plastic or plasticizable chloroprene polymers.

This new polychloroprene crepe rubber is particularly suitable for use in the manufacture of crepe shoe soles, for the manufacture of rough surfaced synthetic rubber coatings on canvas, etc., used for such purposes as conveyor belting, and for similar purposes.

I claim:

1. A process for preparing a homopolymer of chloroprene particularly suitable for the preparation of polychloroprene crepe rubber, which comprises carrying out the polymerization of the chloroprene in an alkaline aqueous emulsion in the presence of from 0.25% to 2.0% of an acid stable dispersing agent and from 2.0% to 10% of an alkali salt of a rosin acid, based on the weight of the chloroprene, and in the absence of any other plasticity regulating agent, and incorporating in the polymer dispersion, after polymerization is completed, from 0.1% to 3.0% of a tetraalkyl thiuram sulfide in which the four alkyl groups are the same and each contains not more than four carbon atoms, acidifying the latex to a pH of from 6.4 to 7.0, coagulating, washing and drying the resulting polymer.

2. A process for preparing a homopolymer of chloroprene particularly suitable for the preparation of polychloroprene crepe rubber, which comprises carrying out the polymerization of the chloroprene in an alkaline aqueous emulsion in the presence of from 0.25% to 2.0% of an acid stable dispersing agent and from 2.0% to 10% of an alkali salt of a rosin acid, based on the weight of the chloroprene, and in the absence of any other plasticity regulating agent, and incorporating in the polymer dispersion, after polymerization is completed, from 0.1% to 3.0% of tetraethyl thiuram disulfide, acidifying the latex to a pH of from 6.4 to 7.0, coagulating, washing and drying the resulting polymer.

3. A process for preparing a homopolymer of chloroprene particularly suitable for the preparation of polychloroprene crepe rubber, which comprises carrying out the polymerization of the chloroprene in an alkaline aqueous emulsion in the presence of a chloroprene polymerization catalyst, about 0.75% of an acid stable dispersing agent and about 4.0% of an alkali salt of a rosin acid, based on the weight of the chloroprene, and in the absence of any other plasticity regulating agent, and incorporating in the polymer dispersion, after polymerization is completed, about 0.5% of tetraethyl thiuram disulfide, acidifying the latex to a pH of from 6.4 to 7.0, coagulating, washing and drying the resulting polymer.

4. A polychloroprene crepe rubber comprising a homopolymer of chloroprene, produced by the process of claim 1.

ROBERT S. BARROWS.

REFERENCES CITED

The following references are of record in the file of this patent:

UNITED STATES PATENTS

| Number | Name | Date |
|---|---|---|
| 2,029,410 | Carothers | Feb. 4, 1936 |
| 2,234,215 | Youker | Mar. 11, 1941 |
| 2,378,140 | Gudgeon | June 12, 1945 |
| 2,385,688 | Carter | Sept. 25, 1945 |
| 2,417,034 | Youker | Mar. 4, 1947 |